United States Patent
Benosman et al.

(10) Patent No.: US 9,976,765 B2
(45) Date of Patent: May 22, 2018

(54) SYSTEM AND METHOD FOR CONTROLLING OPERATIONS OF AIR-CONDITIONING SYSTEM

(71) Applicant: Mitsubishi Electric Research Laboratories, Inc., Cambridge, MA (US)

(72) Inventors: Mouhacine Benosman, Boston, MA (US); Petros Boufounos, Arlington, MA (US); Boris Kramer, Vlacksburg, VA (US); Piyush Grover, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 504 days.

(21) Appl. No.: 14/640,052

(22) Filed: Mar. 6, 2015

(65) Prior Publication Data

US 2016/0258644 A1 Sep. 8, 2016

(51) Int. Cl.
*F24F 11/00* (2006.01)
*F24F 11/02* (2006.01)
(Continued)

(52) U.S. Cl.
CPC .......... *F24F 11/006* (2013.01); *F24F 11/001* (2013.01); *F24F 11/0076* (2013.01); *G05B 13/04* (2013.01); *G05D 23/1917* (2013.01); *F24F 2011/0047* (2013.01); *F24F 2011/0063* (2013.01); *F24F 2011/0064* (2013.01); *F24F 2011/0075* (2013.01); *G05B 17/02* (2013.01)

(58) Field of Classification Search
CPC .... F24F 11/001; F24F 11/006; F24F 11/0076; F24F 2011/0047; F24F 2011/0063; F24F 2011/0064; F24F 2011/0075; G05B 13/04; G05B 17/02
See application file for complete search history.

(56) References Cited

U.S. PATENT DOCUMENTS 5,735,134 A 4/1998 Liu et al.
6,363,316 B1 * 3/2002 Soliman ................ F02D 11/105
123/399

(Continued)

OTHER PUBLICATIONS

Rouizi et al. "Model reduction through identification—Application to some diffusion convection problems in heat transfer, with an extension towards control st," Comptes Rendus Macinique, vol. 341, No. 11, Nov. 12, 2013. pp. 776-792.

(Continued)

*Primary Examiner* — Abdelmoniem Elamin
(74) *Attorney, Agent, or Firm* — Gene Vinokur; James McAleenan; Hironori Tsukamoto (57) ABSTRACT

A method controls an operation of an air-conditioning system generating airflow in a conditioned environment. The method updates a model of airflow dynamics connecting values of flow and temperature of air conditioned during the operation of the air-conditioning system. The model is updated interactively iteratively to reduce an error between values of the airflow determined according to the model and values of the airflow measured during the operation. Next, the method models the airflow using the updated model and controls the operation of the air-conditioning system using the model.

17 Claims, 10 Drawing Sheets

(51) Int. Cl.
    *G05B 13/04*    (2006.01)
    *G05D 23/19*    (2006.01)
    *G05B 17/02*    (2006.01)

(56)     References Cited

U.S. PATENT DOCUMENTS

| 8,374,725 | B1* | 2/2013 | Ols | F24F 11/0012 |
| | | | | 261/118 |
| 8,725,307 | B2* | 5/2014 | Healey | H05K 7/20745 |
| | | | | 361/694 |
| 8,738,185 | B2* | 5/2014 | Puranen | F24D 5/04 |
| | | | | 126/116 A |
| 9,286,582 | B2* | 3/2016 | Drees | G06Q 10/06 |
| 2011/0040392 | A1 | 2/2011 | Hamann et al. | |
| 2012/0197444 | A1 | 8/2012 | Wang et al. | |
| 2013/0006426 | A1* | 1/2013 | Healey | H05K 7/20836 |
| | | | | 700/278 |
| 2013/0166258 | A1 | 6/2013 | Hamann et al. | |
| 2014/0222241 | A1* | 8/2014 | Ols | G05B 15/02 |
| | | | | 700/299 |
| 2016/0046171 | A1* | 2/2016 | Xia | B60H 1/00064 |
| | | | | 165/203 |
| 2016/0234972 | A1* | 8/2016 | Billet | H05K 7/20745 |
| 2017/0016642 | A1* | 1/2017 | Spalink | F24F 11/001 |
| 2017/0089200 | A1* | 3/2017 | Masse | E21F 1/003 |

OTHER PUBLICATIONS

Ahuja et al. "Reduced order models for control of stratified flows in buildings," 2011 Americabn Control Conference (ACC 2011) San Francisco, CA, USA, Jun. 29-Jul. 1, 20111. IEEE Piscataway NJ. pp. 2083-2088.

Kalashnikova et al "Stabilization of projection based reduced order models for linear time invariant systems via optimization based eigenvalue reassignment," Computer Methods in Applied Mechanics and Engineering, North Holland Amsterdam, NL. vol. 272, Jan. 18, 2014. pp. 251-270.

Vaidya et al. Actuator and sensor placement in linear advection PDE with building system application, Journal of Mathematical Analysis and Applications, vol. 394, No. 1, Apr. 25, 2012. pp. 213-224.

Tu et al. "Toward Compressed DMD: Spectral Analysis of Fluid Flows using Sub-Nyquist-rate PIV Data," Arxiv.org, Cornell University Library, 201 Olin Library Cornell University Ithaca, NY 14853. Jan. 28, 2014.

* cited by examiner

SYSTEM AND METHOD FOR CONTROLLING OPERATIONS OF AIR-CONDITIONING SYSTEM

FIELD OF THE INVENTION

This invention relates generally to air-conditioning systems, and more particularly to controlling operations of the air-conditioning system.

BACKGROUND OF THE INVENTION

Air-conditioning systems, such as heating, ventilating and air conditioning (HVAC) system, are widely used in industrial and residential applications. For example, the air-conditioning system can include one or a combination of variable speed compressors, variable position valves, and variable speed fans to the vapor compression cycle to deliver particular amount of heat. The command inputs to the vapor compression system that delivers that particular amount of heat are often not unique and the various combinations of components consume different amounts of energy. Therefore, it is desirable to operate the vapor compression system using the combination of inputs that minimizes energy and thereby maximizes efficiency.

Conventionally, methods maximizing the energy efficiency rely on the use of mathematical models of the physics of air-conditioning systems. Those model-based methods attempt to describe the influence of commanded inputs of the components of the vapor compression system on the thermodynamic behavior of the system and the consumed energy. In those methods, models are used to predict the combination of inputs that meets the heat load requirements and minimizes energy.

However, the air-conditioning systems are known to vary over time. A model that accurately describes the operation of a vapor compression system at one point in time may not be accurate at a later time as the system changes, for example, due to slowly leaking refrigerant or the accumulation of corrosion on the heat exchangers.

In addition, the models of the air-conditioning system often ignore installation-specific characteristics such as room size, causing the model of the air-conditioning system to deviate from operation of the system. For example, the knowledge of the airflow produced during an operation of air-conditioning system can be used to optimize the operation of the system. However, the physical model of the airflow is of infinite dimension and too complex to be used in real time control applications. In addition, the model of the airflow can also change during the operation of the air-conditioning system.

Accordingly, there is a need for a system and a method for controlling air-conditioning system using real time knowledge of the airflow produced during the operation of the system.

SUMMARY OF THE INVENTION

It is an object of present invention to provide a system and a method for controlling an operation of an air-conditioning system such that heat load requirements of the operation are met, and a performance of the system is optimized. It is a further object of the invention to provide such a system and a method that use a model of the airflow in controlling the air-conditioning system. It is a further object of the invention to provide such a system and a method that optimizes the performance of the air-conditioning system over time during the operation of the air-conditioning system.

Some embodiments of the invention address a problem of determining and updating the model of the airflow dynamics, such that the model accurately represent the dynamics of the airflow and is able to adapt to the changes in the conditioned environment. Accordingly, some embodiments use the model of low dimension suitable for real time update and control. For example, in some embodiments the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

To that end, some embodiments address a model reduction problem aim to reduce a complex model of, e.g., an infinite dimension to a simpler model of a lesser dimension, e.g., a finite dimension. In this context, the model reduction problem means determining all parameters or coefficients of the simpler model such that an error between performance measurements of the system according to the complex model and the system according to the simpler model is minimized. For example, in air flow modeling estimation and control applications, there is a need to transform the PDE models representing the air flow with ODE models that have lesser dimension and complexity. Such reduction can allow a real-time control of the air flow systems, such as air conditioning systems.

Some embodiments of the invention are based on a realization that the problem of representing a complex model of a system with a simpler model of the system can be transformed into a virtual control problem of controlling the system of the simpler model to track a reference trajectory of the performance measurements determined using the complex model of the system. In this virtual control problem, the control inputs include the coefficients of the simpler model, and the output of the virtual control is performance measurement determined for the system according to the simpler model with input coefficients.

For example, reducing the PDE model to the ODE model can be seen as a virtual control problem where the controlled output is the ODE solution over a given time interval, the reference time-varying output trajectory is the solution of the PDE model, and the control signals are the coefficients of the ODE model.

The solution to the virtual control problem is the control inputs, i.e., the coefficients of the simpler model, reducing a cost function representing the tracking error. This realization allows using control theory methods to virtually control the virtual control problem to determine the coefficients of the simpler model.

Accordingly, one embodiment of the invention discloses a method for controlling an operation of an air-conditioning system generating airflow in a conditioned environment. The method includes determining values of the airflow measured in the conditioned environment during the operation of the air-conditioning system; updating a model of airflow dynamics connecting values of flow and temperature of air conditioned during the operation of the air-conditioning system, wherein the updating iteratively reduces an error between values of the airflow determined according to the model and the measured values of the airflow; modeling the airflow using the updated model; and controlling the operation of the air-conditioning system using the modeled airflow. The steps of the method are performed using at least one processor of a controller.

Another embodiment discloses a system for controlling an operation of an air-conditioning system generating airflow in a conditioned environment including a set of sensors for measuring values of the airflow in the conditioned environment; and a controller for controlling the operation based on the airflow. The controller includes a memory storing a model of airflow dynamics connecting values of flow and temperature of air conditioned during the operation of the air-conditioning system, and a processor for updating iteratively the model of airflow dynamics to reduce an error between values of the airflow determined according to the model and the values of the airflow measured during the operation.

Yet another embodiment discloses an air-conditioning system including a user input interface for receiving a setpoint; an evaporator having a fan for adjusting an air-flow rate through a heat exchanger; a condenser having a fan for adjusting the air-flow rate through the heat exchanger; a compressor having a speed for compressing and pumping refrigerant through the system; an expansion valve for providing an adjustable pressure drop between a high-pressure portion and a low-pressure portion of the vapor compression system; a set of sensors for measuring values of the airflow in the conditioned environment; and a controller for controlling the operation based on the airflow to achieve the setpoint. The controller includes a memory storing a model of airflow dynamics connecting values of flow and temperature of air conditioned during the operation of the air-conditioning system, and a processor for updating iteratively the model of airflow dynamics to reduce an error between values of the airflow determined according to the model and the values of the airflow measured during the operation.

Definitions

In describing embodiments of the invention, the following definitions are applicable throughout (including above).

A "control system" or a "controller" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

An "air-conditioning system" or a heating, ventilating, and air-conditioning (HVAC) system refers to a system that uses the vapor compression cycle to move refrigerant through components of the system based on principles of thermodynamics, fluid mechanics, and/or heat transfer. The air-conditioning systems span a very broad set of systems, ranging from systems which supply only outdoor air to the occupants of a building, to systems which only control the temperature of a building, to systems which control the temperature and humidity.

"Components of an air-conditioning system" refer to any components of the system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the air-conditioning system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in the air-conditioning system.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "set-point" refers to a target value the system, such as the air-conditioning system, aim to reach and maintain as a result of the operation. The term setpoint is applied to any particular value of a specific set of control signals and thermodynamic and environmental parameters.

A "central processing unit (CPU)" or a "processor" refers to a computer or a component of a computer that reads and executes software instructions.

A "module" or a "unit" refers to a basic component in a computer that performs a task or part of a task. It can be implemented by either software or hardware.

DETAILED DESCRIPTION OF EMBODIMENTS OF THE INVENTION

Figure 1A:
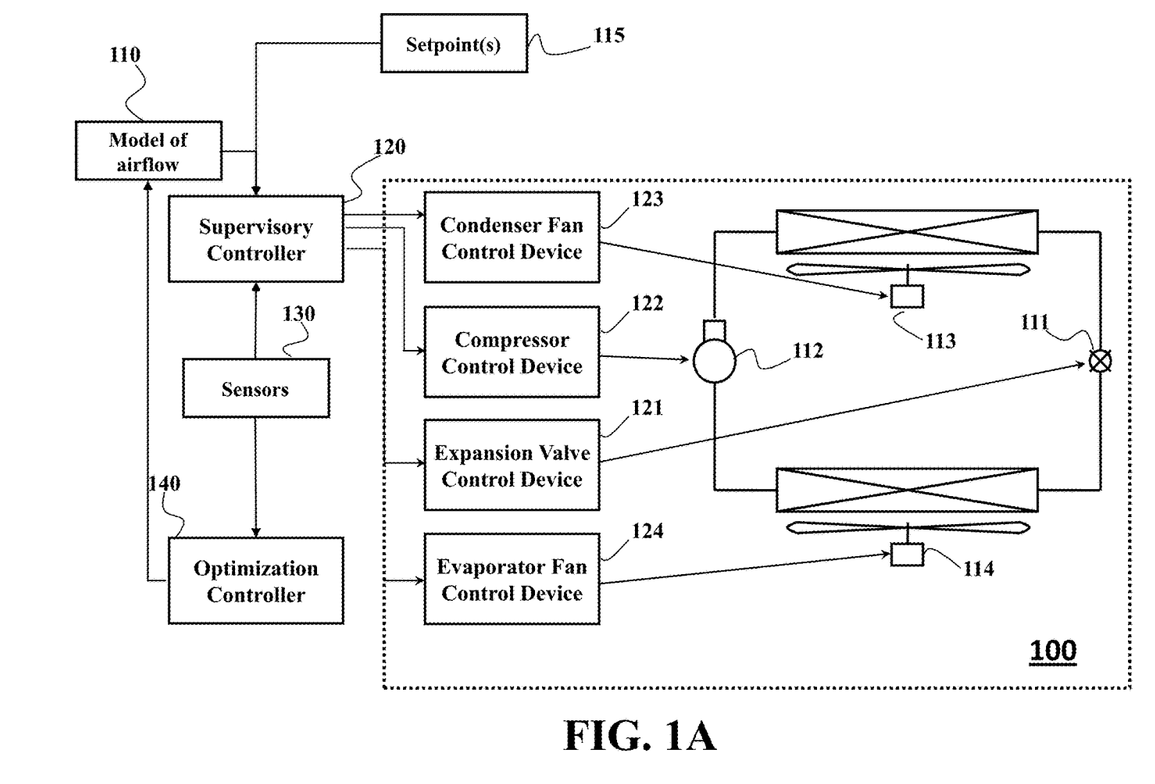
FIG. 1A is a block diagram of an air-conditioning system according to one embodiment of the invention.

FIG. 1A shows a block diagram of an air-conditioning system 100 according to one embodiment of the invention. The system 100 can include one or a combination of components such an evaporator fan 114, a condenser fan 113, an expansion valve 111, and a compressor 112. The system can be controlled by a controller 120 responsible for accepting set-points 115, e.g., from a thermostat, and readings of a sensor 130, and outputting a set of control signals for controlling operation of the components. A supervisory controller 120 is operatively connected to a set of control devices for transforming the set of control signals into a set of specific control inputs for corresponding components. For example, the supervisory controller is connected to a compressor control device 122, to an expansion valve control device 121, to an evaporator fan control device 124, and to a condenser fan control device 123.

The supervisory controller is operatively connected to a model of the airflow dynamics 110 connecting values of flow and temperature of air conditioned during the operation of the air-conditioning system. In this manner, the supervisory controller controls operation of the air-conditioning system such that the set-point values are achieved for a given heat load. For example, the supervisory controller determines and/or updates at least one control input for at least one component of the air-conditioning system to optimize a metric of performance determines using the model. Other configurations of the system 100 are possible.

The system 100 is also controlled by an optimization controller 140 for updating parameters of the model of the airflow dynamics. In some embodiments, the optimization controller 140 updates the model 140 iteratively, e.g., for each or some steps of control, to reduce an error between values of the airflow determined according to the model and values of the airflow measured by the sensors 130 during the operation of the system 100.

In various embodiments the supervisory and optimization controller are implemented as a single or separate systems and generally referred herein as a controller. The controller can include a memory storing the model 110, and a processor for controlling the operation of the system 100 and for updating the model during the operation.

In some embodiments of the invention, one of the objectives of the controller is to optimize the performance of the system measured in accordance with a metric of performance. Examples of the metric include, but are not limited to, an energy consumed by the system during the operation, and efficiency of the system.

Figure 1B:
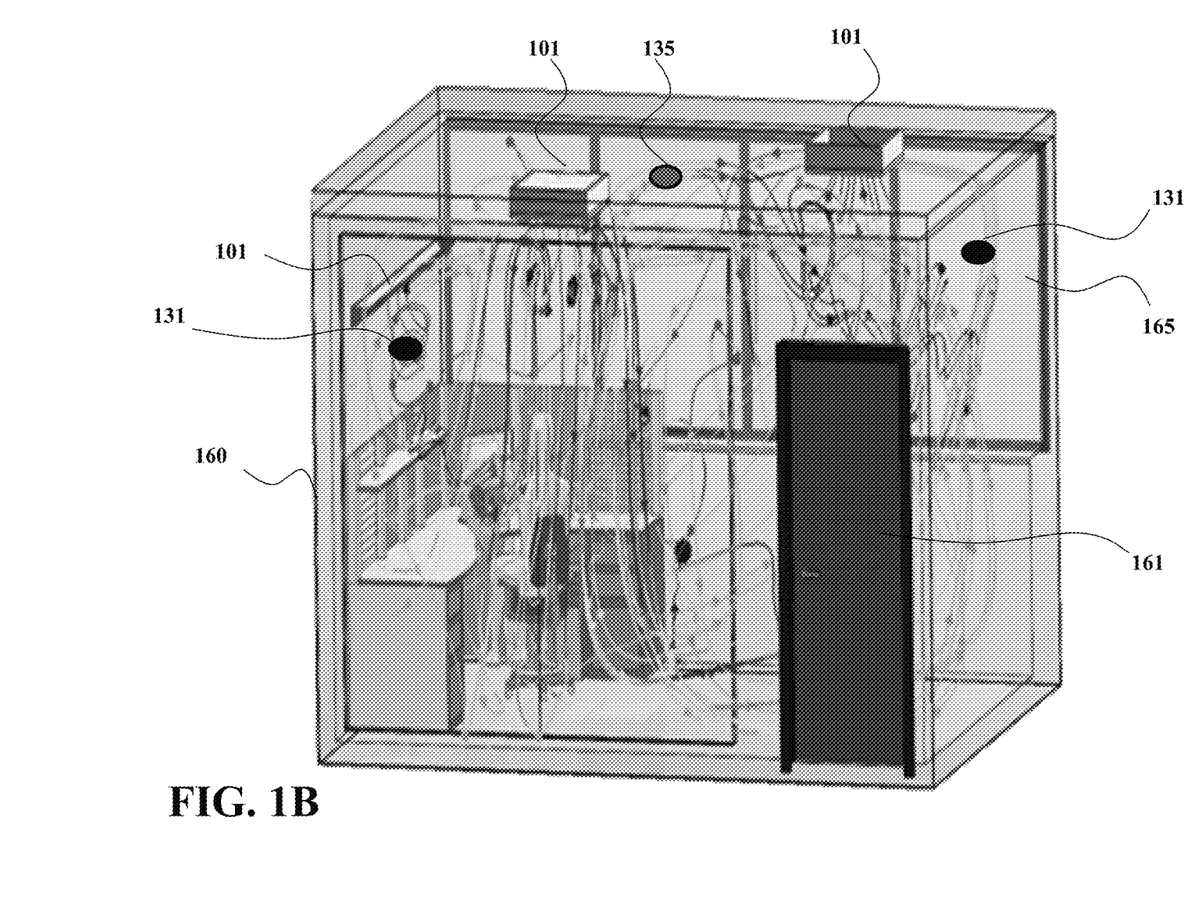
FIG. 1B is a schematic of an example of air-conditioning a room according to some embodiments of the invention.

FIG. 1B shows a schematic of an example of air-conditioning a room 160 according to some embodiments of the invention. In this example, the room 160 has a door 161 and at least one window 165. The temperature and airflow of the room is controlled by the air-conditioning system, such as the system 100 through ventilation units 101. A set of sensors 130 is arranged in the room, such as at least one airflow sensor 131 for measuring velocity of the air flow at a given point in the room, and at least one temperature sensor 135 for measuring the room temperature. Other type of setting can be considered, for example a room with multiple HVAC units, or a house with multiple rooms.

Figure 1C:
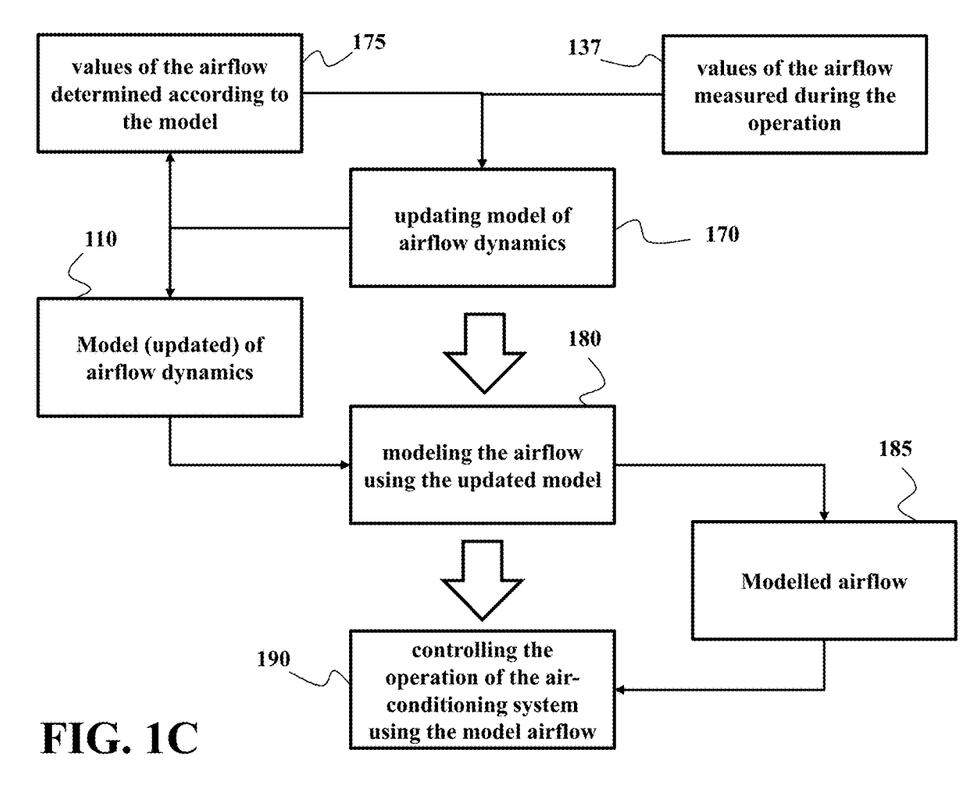
FIG. 1C is a block diagram of a method for controlling an operation of an air-conditioning system generating airflow in a conditioned environment according to some embodiments of the invention.

FIG. 1C shows a block diagram of a method for controlling an operation of an air-conditioning system generating airflow in a conditioned environment according to some embodiments of the invention. Steps of the method are performed using at least one processor of the controller.

The method updates 170 a model 110 of airflow dynamics connecting values of flow and temperature of air conditioner during the operation of the air-conditioning system. In various embodiments, the updating step 170 iteratively reduces an error between values 175 of the airflow determined according to the model 110 and values 137 of the airflow measured during the operation, e.g., by the sensor 130.

Next, the updated model 110 is used for modeling 180 the airflow 185, and the operation of the air-conditioning system is controlled 190 using the model airflow 185. Due to iterative nature of the update, the model 110 used to determine the values 175 has been previously updated 170 during the previous iteration and the model 110 used to determine the modeled airflow 185 is updated during the current iteration.

Figure 1D:
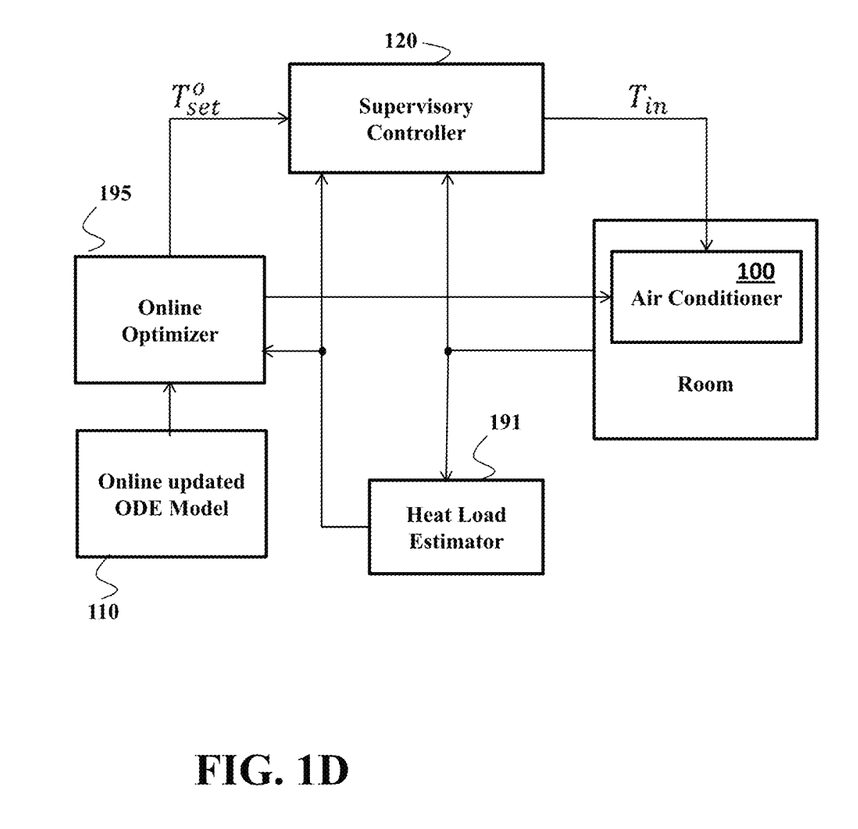
FIG. 1D is a block diagram of the method for controlling one or combination of a vent angle and a room inlet air temperature according to one embodiment of the invention.

FIG. 1D shows a block diagram of a method for controlling one or combination of a vent angle and room inlet air temperature of the air-conditioning system to maintain a set point at certain location in the room according to one embodiment of the invention. The online optimizer 195 obtains heat load estimate from the estimator 191, and determines the vent angle using the updated model 110. The vent angle optimizes the air flow, which in turn can reduce the setpoint and optimize the efficiency of the air-conditioning system. For example, the online optimizer 195 can output a modified set point to the controller 190 and can output a vent angle to the system 100. The supervisory controller 120 operates the system 100 at determined inlet temperature to achieve set-point at the given location.

Some embodiments of the invention address a problem of determining and updating the model of the airflow dynamics, such that the model accurately represent the dynamics of the airflow and is able to adapt to the changes in the conditioned environment, such as a room 160 caused by, e.g. opening and closing of a window or a door. Accordingly, some embodiments use the model of low dimension suitable for real time update and control. For example, in some embodiments the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

To that end, some embodiments address a model reduction problem aim to reduce a complex model of, e.g., an infinite dimension to a simpler model of a lesser dimension, e.g., a finite dimension. In this context, the model reduction problem determines all parameters or coefficients of the simpler model such that an error between performance measurements of the system according to the complex model and the system according to the simpler model is minimized. For example, in air flow modeling estimation and control applications, there is a need to transform the PDE models representing the air flow with ODE models that have lesser dimension and complexity. Such reduction can allow a real-time control of the air flow systems, such as air conditioning systems.

For example, according to the principles of physics, the physical model of the airflow dynamics can be modeled with PDEs also called Boussinesq equations. The Boussinesq equations are difficult to solve in closed-from (nonlinear)

and computationally expensive to solve numerically, because their exact solution lies in an infinite dimensional space, but includes all the frequencies or modes of the airflow dynamic.

The Boussinesq equations are given by:

$$\vec{u}_t = \mu \Delta \vec{u} - (\vec{u} \cdot \nabla)\vec{u} - \nabla p - T$$

$$\nabla \cdot \vec{u} = 0$$

$$T_t = k\Delta T - u \cdot \nabla T.$$

In this equation, T is a temperature scalar variable and $\vec{u}$ is a velocity vector in three dimensions. Here, $\mu$ is a viscosity and the reciprocal of the Reynolds number, k is the heat diffusion coefficient, and p represents the pressure scalar variable.

The operator $\Delta$ and $\nabla$ are defined as:

$$\Delta = \nabla^2$$

$$\nabla = \left(\frac{\delta}{\delta x}, \frac{\delta}{\delta y}, \frac{\delta}{\delta z}\right)^T.$$

The Boussinesq equation describes the coupling between the airflow and the temperature in the room but is of infinite dimensions. In addition, the Boussinesq equation has uncertain conditions where the boundary conditions of the PDE are changing over time or the case where one of the coefficients involved in the PDE are changing. These mathematical changes actually reflect some real changes in the room. For example, an opening and closing of a window or a door in the room changes the boundary conditions of the Boussinesq PDE. Similarly, weather changes, such as daily and seasonal changes, affect the difference between the temperature in the room and outside of the room, which in turn affect some of the PDE coefficients, e.g. Reynold's number can be affected.

In all these scenarios, the available model reduction techniques fail to have a unified approach to obtain a reduced order (or reduced dimension) models of the airflow in a room covering all the above scenarios, i.e., parametric uncertainties as well as boundaries conditions uncertainties.

Some embodiments of the invention are based on a realization that the problem of representing a complex model of a system with a simpler model of the system can be transformed into a virtual control problem of controlling the system of the simpler model to track a reference trajectory of the performance measurements determined using the complex model of the system. In this virtual control problem, the control inputs include the coefficients of the simpler model, and the output of the virtual control is performance measurement determined for the system according to the simpler model with input coefficients.

For example, reducing the PDE model to the ODE model can be seen as a virtual control problem where the controlled output is the ODE solution over a given time interval, the reference time-varying output trajectory is the solution of the PDE model, and the control signals are the coefficients of the ODE model.

The solution to the virtual control problem is the control inputs, i.e., the coefficients of the simpler model, minimizing a cost function representing the tracking error. This realization allows using model free control optimization methods to virtually control the virtual control problem to determine the coefficients of the simpler model.

For example, in one embodiment of the invention a reduced order model (ROM) has the quadratic form $$\dot{x}_r = b + Ax_r + x_r^T B x_r,$$

where b, A, B are constants related to the constants of the PDE equation and to the type of model reduction algorithm used, and $x_r$ is of a reduced dimension r and represents the vector of the reduced order states. The original states of the system x can be recovered from $x_r$ using the following simple algebraic equation $$x(t) \approx \Phi x_r(t),$$

where x is usually a vector of high dimension n>>r, containing the room airflow and room temperature at n desired points or locations of the room, obtained from the spatial discretization of the PDE equation, and $\Phi$ is a matrix formed by concatenating given vectors called modes or basis vectors of the ROM. These modes differ depending on which model reduction method is used. For example, proper orthogonal decomposition (POD) can be used or dynamic mode decomposition (DMD) method etc.

However, the solution of the ROM model can lead to unstable solution (divergent over a finite time support) which is not reproducing the physics of the original PDE models having a viscous term that makes the solutions always stable, i.e. bounded over a bounded time support.

Accordingly, some embodiments modifies the reduce order model by adding a stability parameter representing a difference between the reduced order model and the physical model. The stability parameter ensures the stability of the simplified model used by some embodiments of the invention and allows updating only the stability parameter in response to detecting the error between values of the airflow determined according to the model and values of the airflow measured during the operation, which simplify the updating 170.

Accordingly, in some embodiments of the invention, the model 110 of the airflow dynamic is $$\dot{x}_r = b + Ax_r + x_r^T B x_r + F(K,x),$$

where F is an extra term, i.e., the stability parameter, added to stabilize the solutions of the ROM model. This term can be linear or nonlinear function of its arguments. The term K represents a vector of coefficients that should be tuned to ensure the stability as well as the fact that the ROM needs to reproduce the dynamics or solutions of the original PDE model.

In some embodiments, the mapping F is $$F(K,x) = K(t,x_m)x,$$

wherein K is a vector of stability coefficients ensuring a stability of the model of the airflow dynamics. The coefficients of the vector K can be optimized using an iterative optimization-based tuning.

Figure 2:
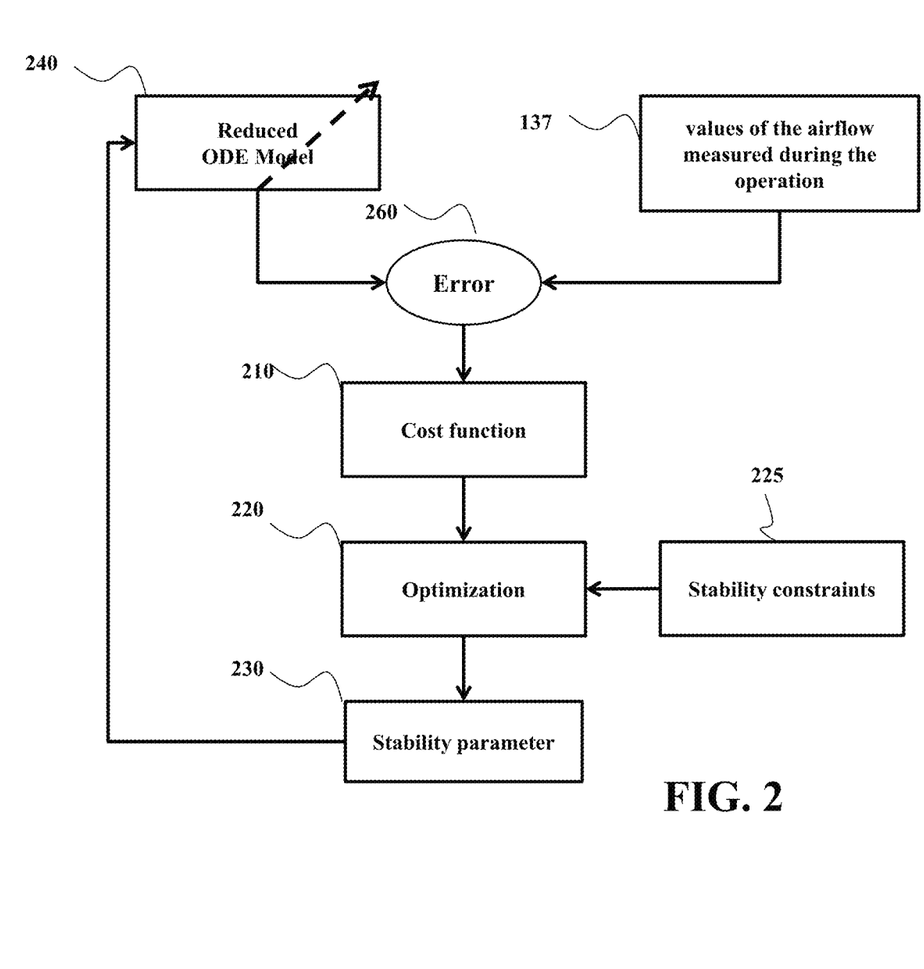
FIG. 2 is a block diagram a model reduction method according to some embodiments of the invention.

FIG. 2 shows a block diagram a model reduction method according to some embodiments of the invention. For example, one embodiment updates the simplified order model 240 modified with a stability parameter by optimizing 220 a cost function 210 of the error 260 between values of the airflow determined according to the model and values of the airflow measured during the operation subject to stability constraints 225.

For example, in one embodiment the optimization 220 includes minimizing a cost function 210 of the error subject to stability constraints 225 according to $$\text{Min}_{K(t)} Q(e)$$

$$K(t) \in \text{Stability constraints},$$

wherein the error includes $$e = x(t) - x_m(t),$$

wherein x(t) are the values of the airflow determined according to the model at a time t, and $x_m(t)$ are the values of the airflow measured during the operation at the time t.

The cost function includes $$Q(e) = \int_{t_0}^{t_f} e(t)^T W e(t) dt, W > 0,$$

wherein W is a positive definite weight matrix, and $t_0$, $t_f$ are an initial value and a final value of a given time interval of the operation, and T is a transpose operator.

In some embodiments, the updating 170 includes the update of only the stability parameter 230 and/or the vector of stability coefficients subject to stability constraints. For example, the stability constraints for the vector of stability coefficients are $$K \in \{K \in R^r, \text{ s.t. eig}(\tilde{A}) < 0\},$$

wherein eig (.) stands for eigenvalues of the matrix (.), and the matrix $\tilde{A}$ is $$\tilde{A} = A + x_m(t)^T (B^T + B) - K(t).$$

In some embodiments, the optimization 220 of the cost function is performed on-line during the operation of the air-conditioning system. For example, one embodiment optimizes the cost function using a gradient descent with numerical evaluation of the gradient of the cost function. Other embodiments use different existing nonlinear programming methods to solve the optimization problem online 220. The solution of the optimization problem leads to optimal coefficients 230, which is used to update the ROM 240 by updating the function F as described above.

Some embodiments of the invention determine the error 40 between a subset of states of the airflow measured by a set of sensors placed in an environment conditioned by the air-conditioning system and a corresponding subset of states of the airflow determined using the model. In this case the cost function 210 is only function of the error 260 between the measured components of x and the corresponding components of the ROM solution vector.

Figure 3:
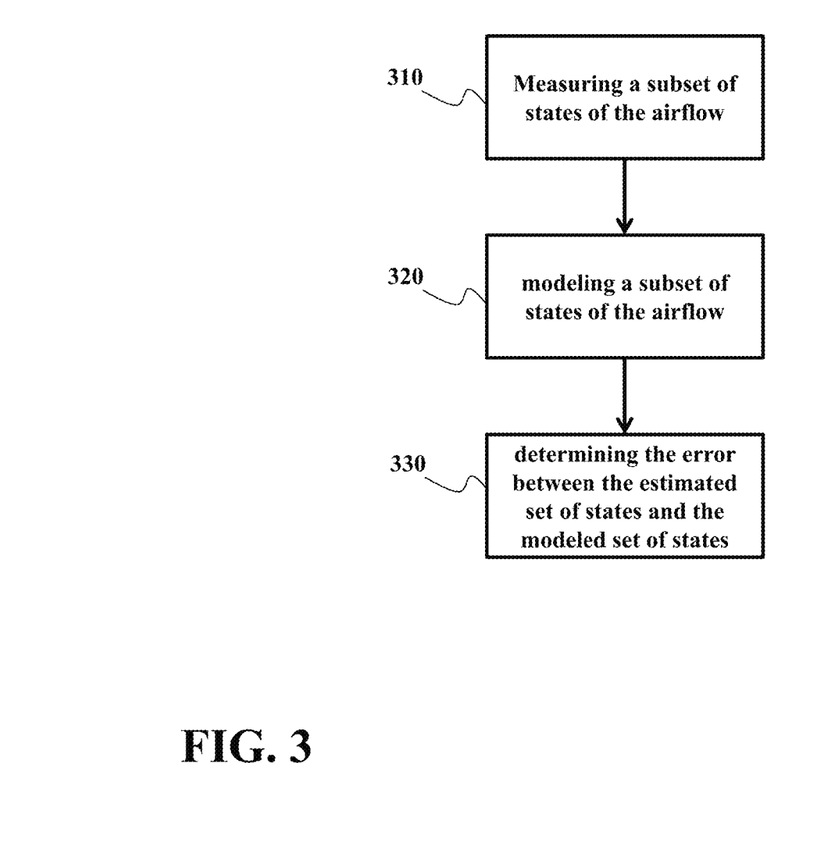
FIG. 3 is a block diagram of a method for determining the error based on more complete set of states of the airflow according to one embodiment of the invention.

FIG. 3 shows a block diagram of a method for determining the error 260 based on more subset of states of the airflow according to one embodiment of the invention. The embodiment determines 310 a subset of states of the airflow measured by a set of sensors placed in an environment conditioned by the air-conditioning system. The embodiment models 320 the airflow using the model to produce a modeled subset of states of the airflow corresponding to the subset of measured states and determines 340 the error between the measured subset of states and the modeled subset of states.

Figure 4:
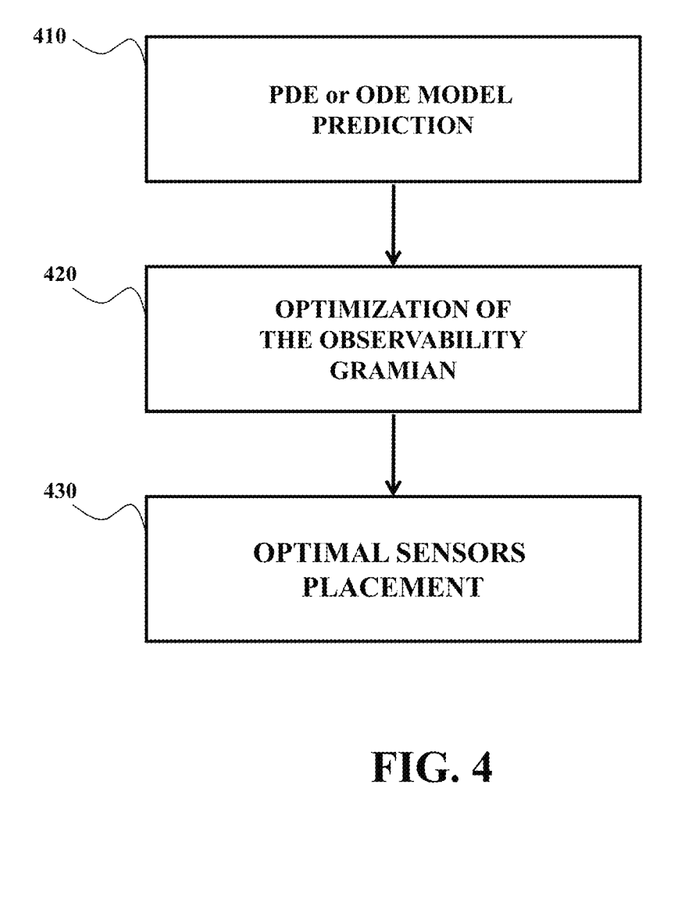
FIG. 4 is a schematic of a method for determining placements of the sensors in the conditioned environment, such as the room, according to some embodiment of the invention.

FIG. 4 shows a schematic of a method for determining placements of the sensors in the conditioned environment, such as the room 160, according to some embodiment of the invention. These embodiments are based on recognition that it is unrealistic to measure all the components of the vector x of the temperature and flow of the air in the room. Accordingly, these embodiments arrange the placement 430 of the sensors optimally to maximize 420 an observability gramian of the ODE or the PDE 410.

Figure 5:
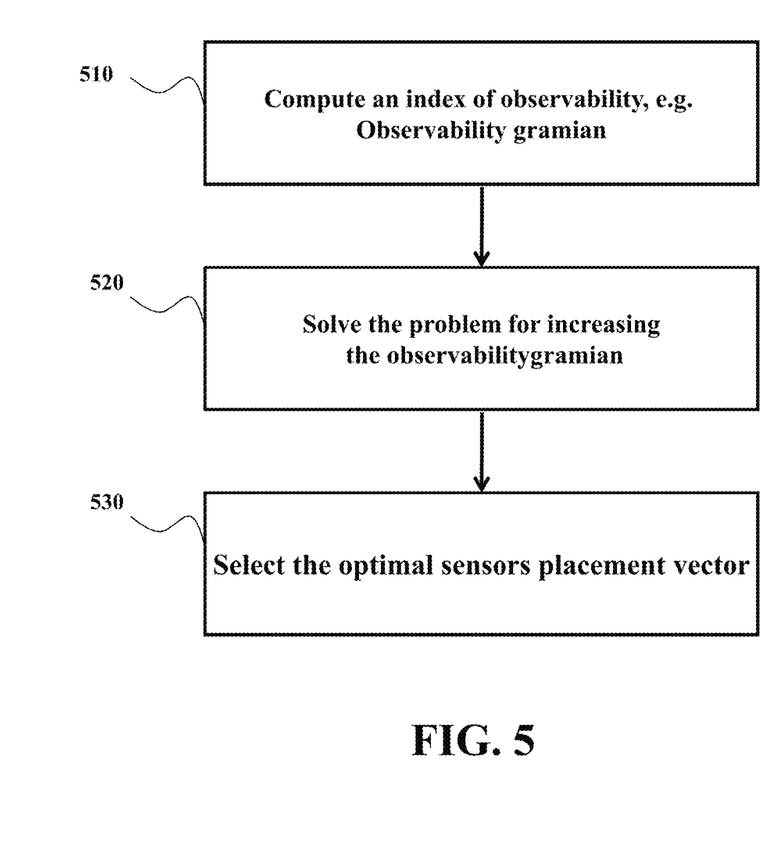
FIG. 5 is a block diagram of a method for optimization observability gramian according to one embodiment.

FIG. 5 shows a block diagram of a method for optimization observability gramian according to one embodiment of the invention. The embodiment selects a desired observability index 510. For example, the embodiment selects the observability index as an observability gramian, which is the rank of the observability matrix, defined as a function of the system PDE or ODE model's coefficients. Then, the observability gramian is increased 520, e.g., maximized with respect to the position vector of the sensors. The solution of this maximization problem gives the optimal selection of the sensors positions 530

Some embodiments of the invention are based on a recognition that the operation of the air-conditioning system in different environments can result in different regimes of the airflow dynamics. For example, if the room doors and windows are closed, the airflow inside of the room has a certain dynamic, if one of the windows is opened, then the airflow has a different dynamic. Accordingly, some embodiments determine which regime is the airflow in at a given time. This regime detection can help selecting the proper parameters of the physical model for the specific regime and then subsequently obtaining the corresponding simplified reduced order model for the particular regime.

Figure 6:
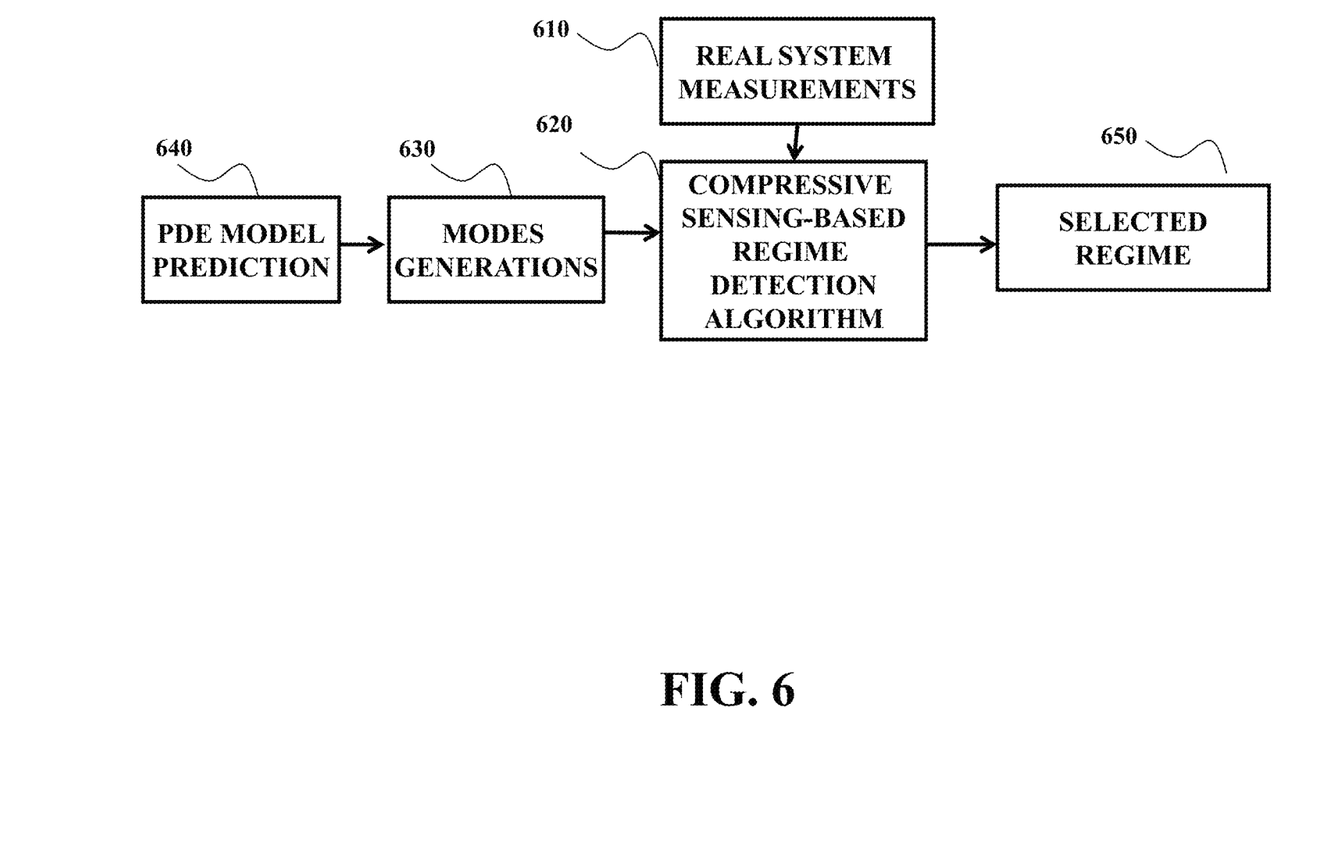
FIG. 6 is a block diagram of a method for selecting a regime of the airflow for controlling the air-conditioning system according to one embodiment.

FIG. 6 shows a block diagram of a method for selecting a regime of the airflow for controlling the air-conditioning system according to one embodiment. The method generates all possible modes 630 of the physical model 640 for all possible regimes, and then compares the modes to the modes reconstructed from the values 610 of the airflow and temperature measured during the operation. The real-time mode reconstruction is done using a compressive sensing 620. Finally, the method selects the reduced order model associated with dominant modes of the physical model.

In one embodiment the measurements $x_m$ are used to solve the following compressive sensing problem $$\text{Min}_{x_r} \| x_r \|_1$$

$$\| x_m - \Phi x_r \|_2 \leq tol,$$

where tol is a desired tolerance value.

Here, we underline that the matrix $\Phi$ is obtained by concatenating all possible modes generated 630 from all possible regimes predicted by the PDE model 640. In this case, when the above compressive sensing problem is solved 620, the amplitude of the vector $x_r$ components indicate prominent regime at the time where the measurements are done. For example, if the first three elements of the vector $x_r$ are much larger than the other elements, then the three first modes are the dominant modes and the associated regime is then selected 650 to be the prominent regime. In other embodiments other norms can be used in the definition of the compressive sensing optimization problem, e.g., 1p–norm p>1.

Figure 7:
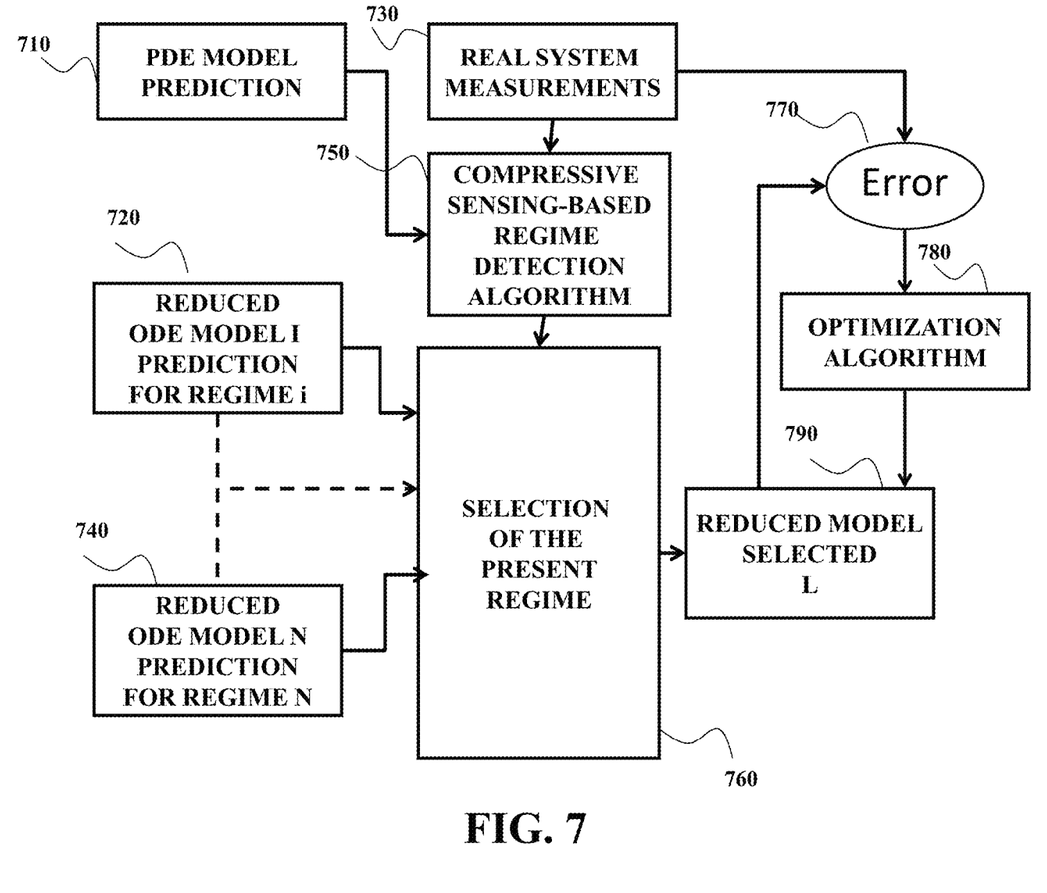
FIG. 7 is a block diagram of a method for selecting ROM for the current regime according to one embodiment of the invention.

FIG. 7 shows a block diagram of a method for selecting ROM for the current regime according to one embodiment of the invention. The PDE model 710 is used together with real measurements of the flow and temperature 730 to be fed to a compressive sensing algorithm 750 to detect the present regime 760, and then the associated ROM 720, 740 is selected. The selected ROM 790 is then solved and its solution is compared 770 to the real measurements 730, the obtained error 770 is fed to an optimization algorithm 780 to optimize some coefficients of the ROM model 790 and improve the ROM prediction of the airflow and the room temperature.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of an air-conditioning system generating airflow in a conditioned environment, comprising:
    determining values of the airflow measured in the conditioned environment during the operation of the air-conditioning system;
updating a model of airflow dynamics connecting values of flow and temperature of air conditioned during the operation of the air-conditioning system, wherein the updating iteratively reduces an error between values of the airflow determined according to the model and the measured values of the airflow, wherein the model includes a reduced order model having a number of parameters less than a physical model of the airflow according to a Boussinesq equation, wherein the Boussinesq equation is a partial differential equation (PDE), and wherein the reduced order model is an ordinary differential equation (ODE);
    modeling the airflow using the updated model; and
    controlling the operation of the air-conditioning system using the modeled airflow, wherein steps of the method are performed using at least one processor of a controller.

2. The method of claim 1, wherein the updating minimizes a cost function of the error subject to stability constraints.

3. The method of claim 1, wherein the model includes a stability parameter representing a difference between the reduced order model and the physical model, and wherein the updating comprises:

updating only the stability parameter of the model in response to detecting the error.

4. The method of claim 3, wherein the model is $$\dot{x}_r = b + Ax_r + x_r^T Bx_r + F(K,x)$$

wherein b, A, B are constants, x is a vector of states of the airflow, $x_r$ is a vector of the states with a reduced dimension r, F is the stability parameter represented as a function of its arguments, and K is a vector of stability coefficients ensuring a stability of the model of the airflow dynamics.

5. The method of claim 4, wherein the updating includes minimizing a cost function of the error subject to stability constraints according to $$\text{Min}_{K(t)} Q(e)$$
$$K(t) \in \text{Stability constraints,}$$

wherein the error includes $$e = x(t) - x_m(t),$$

wherein x(t) are the values of the airflow determined according to the model at a time t, and $x_m(t)$ are the values of the airflow measured during the operation at the time t, wherein the cost function includes $$Q(e) = \int_{t_0}^{t_f} e(t)^T We(t) dt, W > 0,$$

wherein W is a positive definite weight matrix, and $t_0$, $t_f$ are an initial value and a final value of a given time interval of the operation, and T is a transpose operator.

6. The method of claim 5, wherein the stability constraints for the vector of stability coefficients are $$K \in \{K \in R^r, \text{ s.t. } \text{eig}(\tilde{A}) < 0\},$$

wherein eig (.) stands for eigenvalues of the matrix (.), and the matrix $\tilde{A}$ is $$\tilde{A} = A + x_m(t)^T(B^T + B) - K(t).$$

7. The method of claim 1, further comprising:
    determining the reduced order model using a model reduction method projecting an exact solution of the Boussinesq equation with infinite dimensions into an approximate solution of finite dimension; and
    adding the stability parameter to the reduced order model to form the model of the airflow dynamics.

8. The method of claim 1, further comprising:
    determining the error between a subset of states of the airflow measured by a set of sensors placed in an environment conditioned by the air-conditioning system and a corresponding subset of states of the airflow determined using the model.

9. The method of claim 8, wherein the model includes a reduced order model according to an ordinary differential equation (ODE) having a number of parameters less than a physical model of the airflow according to a partial differential equation (PDE), wherein the sensor in the set of sensors are arranged to maximize an observability gramian of the ODE or the PDE.

10. The method of claim 1, further comprising:
    determining a subset of states of the airflow measured by a set of sensors placed in the conditioned environment;
    estimating a set of states of the airflow from the subset of states to produce an estimated set of states of the airflow;
    modeling the airflow using the model to produce a modeled set of states of the airflow; and determining the error between the estimated set of states and the modeled set of states.

11. The method of claim 1, further comprising:
reconstructing modes of the physical model from the values of the airflow measured during the operation using a compressive sensing; and
selecting the reduced order model associated with dominant modes of the reconstructed modes of the physical model.

12. The method of claim 1, wherein the controlling comprises:
updating at least one control input for at least one component of the air-conditioning system to optimize a metric of performance determined using the model.

13. A system for controlling an operation of an air-conditioning system generating airflow in a conditioned environment, comprising:
a set of sensors for measuring values of the airflow in the conditioned environment; and
a controller for controlling the operation based on the airflow, wherein the controller comprises:
a memory storing a model of airflow dynamics connecting values of flow and temperature of air conditioned during the operation of the air-conditioning system, wherein the model includes a reduced order model according to an ordinary differential equation (ODE) having a number of parameters less than a physical model of the airflow according to a partial differential equation (PDE), wherein sensor in the set of sensors are arranged to maximize an observability gramian of the ODE or the PDE; and
a processor for updating iteratively the model of airflow dynamics to reduce an error between values of the airflow determined according to the model and the values of the airflow measured during the operation.

14. The system of claim 13, wherein the controlling changes a vent angle of the air-conditioning system.

15. The system of claim 13, wherein the model a stability parameter representing a difference between the reduced order model and the physical model, and wherein the processor updating only the stability parameter of the model in response to detecting the error by minimizing a cost function of the error subject to stability constraints.

16. The system of claim 13, wherein the air-conditioning system, comprises:
an evaporator having a fan for adjusting an air-flow rate through a heat exchanger;
a condenser having a fan for adjusting the air-flow rate through the heat exchanger;
a compressor having a speed for compressing and pumping refrigerant through the system; and
an expansion valve for providing an adjustable pressure drop between a high-pressure portion and a low-pressure portion of the vapor compression system.

17. An air-conditioning system, comprising:
a user input interface for receiving a setpoint;
an evaporator having a fan for adjusting an air-flow rate through a heat exchanger;
a condenser having a fan for adjusting the air-flow rate through the heat exchanger;
a compressor having a speed for compressing and pumping refrigerant through the system;
an expansion valve for providing an adjustable pressure drop between a high-pressure portion and a low-pressure portion of the vapor compression system;
a set of sensors for measuring values of the airflow in the conditioned environment; and
a controller for controlling the operation based on the airflow to achieve the setpoint, wherein the controller comprises:
a memory storing a model of airflow dynamics connecting values of flow and temperature of air conditioned during the operation of the air-conditioning system, wherein the model includes a reduced order model having a number of parameters less than a physical model of the airflow, and a stability parameter representing a difference between the reduced order model and the physical model, and wherein the processor updating only the stability parameter of the model in response to detecting the error by minimizing a cost function of the error subject to stability constraints; and
a processor for updating iteratively the model of airflow dynamics to reduce an error between values of the airflow determined according to the model and the values of the airflow measured during the operation.

* * * * *